(12) United States Patent
Barrett

(10) Patent No.: US 7,143,073 B2
(45) Date of Patent: Nov. 28, 2006

(54) METHOD OF GENERATING A TEST SUITE

(75) Inventor: Geoff Barrett, Westbury Park (GB)

(73) Assignee: Broadcom Corporation, Irvine, CA (US)

( * ) Notice: Subject to any disclaimer, the term of this patent is extended or adjusted under 35 U.S.C. 154(b) by 696 days.

(21) Appl. No.: 10/115,011

(22) Filed: Apr. 4, 2002

(65) Prior Publication Data

US 2003/0191985 A1    Oct. 9, 2003

(51) Int. Cl.
*G06F 15/18* (2006.01)

(52) U.S. Cl. .......................................... 706/37; 706/39
(58) Field of Classification Search ............... 706/37; 714/32, 724, 30; 716/2; 703/2
See application file for complete search history.

(56) References Cited

U.S. PATENT DOCUMENTS

| | | | | | |
|---|---|---|---|---|---|
| 4,827,521 | A | * | 5/1989 | Bahl et al. | 704/256.4 |
| 5,500,941 | A | * | 3/1996 | Gil | 714/38 |
| 5,526,465 | A | * | 6/1996 | Carey et al. | 704/250 |
| 5,606,646 | A | * | 2/1997 | Khan et al. | 706/2 |
| 5,623,499 | A | * | 4/1997 | Ko et al. | 714/724 |
| 5,724,504 | A | * | 3/1998 | Aharon et al. | 714/33 |
| 5,828,812 | A | * | 10/1998 | Khan et al. | 706/2 |
| 5,918,037 | A | * | 6/1999 | Tremblay et al. | 716/2 |
| 5,943,659 | A | * | 8/1999 | Giles et al. | 706/2 |
| 6,134,675 | A | * | 10/2000 | Raina | 714/37 |
| 6,269,457 | B1 | * | 7/2001 | Lane | 714/38 |
| 6,523,151 | B1 | * | 2/2003 | Hekmatpour | 716/4 |
| 6,577,982 | B1 | * | 6/2003 | Erb | 702/120 |
| 6,944,848 | B1 | * | 9/2005 | Hartman et al. | 717/124 |
| 2003/0233600 | A1 | * | 12/2003 | Hartman et al. | 714/32 |

OTHER PUBLICATIONS

"A Markov chain modeling technique for evaluating pipelined processor designs", by Unwala, I.H.; Cragon, H.G.; Circuits and Systems, 1994, Proceedings of the 37th Midwest Symposium on vol. 1, Aug. 3-5, 1994 pp. 319-322 vol. 1.*

"Design evaluation of pipelined processors using finite state machine analysis with Markov chains", by Unwala, I.H.; Cragon, H.G.; Economics of Design, Test, and Manufacturing, 1994. Proceedings, Third Int'l Conf on the May 16-17, 1994 pp. 147-151.*

"Pipelined Processor Modeling with Finite Homogeneous Discrete-time Markov Chain", Ph D. Dissertation by Ishaq Hasanali Unwala, May 1998.*

"Fuzzy Markov chains", by Buckley, J.J.; Feuring, T.; Hayashi, Y.; IFSA World Congress and 20th NAFIPS International Conference, 2001. Joint 9th Jul. 25-28, 2001 pp. 2708-2711 vol. 5.*

(Continued)

*Primary Examiner*—David Vincent
*Assistant Examiner*—Mai T. Tran
(74) *Attorney, Agent, or Firm*—Sterne, Kessler, Goldstein & Fox PLLC

(57) ABSTRACT

The invention relates to generating a test suite of instructions for testing the operation of a processor. A fuzzy finite state machine with a plurality of states 2 and transitions 4 determined by weights W1, W2 ... W10 is used to generate a sequence of instructions. The weights determine the next state as well as an instruction and operands for each state. The weights may be adapted based on the generated sequence and further sequences are generated.

12 Claims, 3 Drawing Sheets

OTHER PUBLICATIONS

"An Introduction to Hidden Markov Models", by Rabiner, L.R.; Juang, B.H.; ASSP Magazine, IEEE [see also IEEE Signal Processing Magazine] vol. 3, Issue 1, Jan. 1986 pp. 4-16.*

Chapter 4: Markov Models, by Christopher Manning & Hinrich Schutze, DRAFT! c fl1996.*

"Compacting Regression-Suites On-The-Fly", by Buchnik, E.; Ur, S.; Software Engineering Conference, 1997. Asia Pacific . . . and International Computer Science Conference 1997. APSEC '97 and ICSC '97. Proceedings Dec. 2-5, 1997 pp. 385-394.*

"Probabilistic Sequence Models", http://globin.cse.psu.edu/courses/fall2002/prob.pdf.*

Model Based Testing, DACS Gold Practices Website.*

Lecture 7. Inf1A: Probabilistic Finite State Machines and Hidden Markov Models. http://www.inf.ed.ac.uk/teaching/courses/inf1/cl/notes/Comp7.pdf.*

"Design Evaluation of Pipelined Processors using Finite State Machine Analysis with Markov Chains", Unwala, I.H.; Cragon, H.G.; Economics of Design, Test, & Manufacturing, 1994. Proceedings, 3rd Intl Conf on May 16-17, 1994. pp. 147-151.*

"Functional Verification Methodology of Chameleon Processor", Casaubieilh, F.; McIsaac, A.; Benjamin, M.; Bartley, M.; Pogodalla, F.; Ro, F.; Design Automation Conference Proceedings 1996, $33^{rd}$, Jun. 3-7, 1996. pp. 421-426.*

"Verification of Processor Microarchitectures", Shen, J.; Abraham, J.A.; VLSI Test Symposium, 1999. Proceedings 17th IEEE Apr. 25-29, 1999. pp. 189-194.*

"High-level test generation for Design Verification of Pipelined Microprocessors", Van Campenhout, D.; Mudge, T.; Hayes, J.T.; Design Automation Conference, 1999. Proceedings, $36^{th}$, Jun. 21-25, 1999. pp. 185-188.*

"A New Method for On-line State Machine Observation for Embedded Microprocessors", Pflanz, M.; Galke, C.; Vierhaus, H.T.; High-Level Design Validation & Test Workshop, 2000. Proceedings. IEEE International Nov. 8-10, 2000. pp. 34-39.*

Eric Bonabeau and Guy Theraulaz, "Swarm Smarts", *Scientific American*, pp. 73-79, Mar. 2000.

* cited by examiner

METHOD OF GENERATING A TEST SUITE

The invention relates to a method and apparatus for generating a test suite of instructions for testing the operation of a processor.

During the development and manufacture of a processor it is necessary to test the processor for correct operation in as many different situations as possible. It is therefore necessary to generate a sequence of instructions, known as a regression test suite, to test the operation of the processor.

Modern processors frequently use pipelines to increase the speed of operation. In a pipeline mode of operation, a sequence of instructions is processed through a pipeline, in such a manner that while the processing of one or more instructions is being carried out the processor starts to process the next instruction or instructions simultaneously. For example, instructions may pass through a pipeline of steps, including instruction cache read, instruction decode, instruction execution and writeback, in such a manner that later instructions are being read and decoded while earlier instructions are still being executed and the results written back. Pipeline processors increase the need for testing, since it is necessary to test whether the processor can block or otherwise fail when presented with various sequences of instructions.

In order to verify the core of modern processors, it is necessary to generate a regression test suite of considerable size, for example two hundred million to five hundred million instructions. Typical human programmers produce at best around one thousand lines of code per month, so that to produce the total regression test suite would require around twenty thousand man-years. This would be wholly impracticable.

In contrast, a computer can randomly generate many more instructions, for example around ten thousand overnight. This does not represent a complete solution, since it is necessary to define the coverage required of the test suite.

It is known how to use coverage metrics to filter out tests that do not add to the coverage and to determine when to stop generating for a particular metric.

However, this is not sufficient. Most verification plans require some complex sequences of instructions that are very rare when generated within a purely random sequence of instructions. For example, in a pipeline processor sequences of branch instructions can cause difficulty. Thus, enormous numbers of instructions would need to be generated to produce a test suite of sufficient coverage to adequately test a processor.

There is accordingly a need for an improved method of generating a regression test suite.

According to the invention there is provided a method of generating a sequence of instructions and arguments for testing a processor, including: providing a fuzzy finite state machine having a plurality of states corresponding to different instructions and/or arguments, wherein each state can be followed by any of a number of the plurality of states, each state having a set of weights defining the probability of at least one random decision for each state, wherein the at least one random decision includes the decision as to the following state; selecting a first state; making the or each random decision for the state in accordance with the weights to generate corresponding instructions and/or arguments and to determine the next state; repeating the step of making the or each random decision to generate a sequence of instructions and/or arguments randomly in accordance with the weights; and repeating the steps of generating a sequence of instructions in order to generate a plurality of sequences covering predetermined test requirements.

By generating the sequence of instructions automatically and randomly using the weights it is possible to generate a regression test suite to cover predetermined test requirements automatically. Thus, it is possible to cover a user-defined test metric automatically.

The method preferably adapts the weights based on the sequence of instructions or arguments generated. The adaptation may preferably take place after each sequence. Alternatively, the adaptation of weights may take place at predetermined intervals or after predetermined events.

Without the ongoing adjustment of the weights the random sequences of instructions would tend to randomly cover all the possible sequences. Thus types of sequences which required lots of testing would be underrepresented in the instruction sequences generated. By using the invention the weights can be adjusted to correctly generate suitable test sequences.

The step of adapting the weights may include determining a figure of merit for the sequence of instructions; and adjusting the weights as a function of the figure of merit of the sequence of instructions or of the preceding sequences of instructions.

In this way weights that have previously generated useful tests are favoured over weights that have previously proved less successful. The system according to the invention can provide sufficient coverage automatically of rare test sequences by providing a high figure of merit for such test sequences. This allows the system to adapt to favour such sequences.

The step of adjusting the weights may include generating the weights for each generation pseudo-randomly ascribing a higher probability to weights in ranges that gave high figures of merit in previous generations and low probabilities to weights in ranges that gave low figures of merit in previous generations.

The relevance of figures of merit of earlier sets of weights may be decayed with each succeeding sequence so that the figures of relevance of recent sequences have more effect than those of earlier generations.

The figure of merit of a specific sequence may reflect the how well the sequence delivers coverage of tests that previous sequences have not exercised. In this way, the figure of merit will bias the fuzzy finite state machine towards tests that provide coverage of specific requirements. It might at first sight be thought that such positive reinforcement would tend to deliver an undesirable result, namely excessive bunching of tests that would worsen, not improve, the coverage compared with unchanging weights. However, in view of the requirement for considerable numbers of tests with certain specific properties, positive reinforcement may frequently produce beneficial results.

To explain this further, it should be noted that tests often need an involved set of instructions to set up certain conditions. For example, the instructions may need to generate a certain configuration of valid and invalid lines in the cache, or the programming of a set of breakpoint registers. Once this programming has been achieved, many routes can be taken to obtain associated coverage.

Similarly, a template of instructions may be needed, for example where the template involves a branch and the processor needs to be tested with many possible instructions after the branch in the branch shadow. Thus, many similar sequences are required.

By reinforcing the weights, the sequence of instructions to set up certain conditions or the template may be reproduced with higher probability.

By combining figures of merit and decaying the effect of the figures of merit over time, variety in the tests over a long time scale can be combined with shorter term exercising of useful sequences.

The invention also envisage a method of testing a processor, by generating sequences of instructions and feeding the generated sequences to the processor.

The invention also relates to a computer program for carrying out the method as set out above.

A specific embodiment of the invention will now be described, purely by way of example, with reference to the accompanying drawings, in which.

The invention is based on a fuzzy finite machine with a number of states and a set of weights for random decisions for each state. Both the random decisions and the weights may be different for each state. One of the random decisions for each state is the decision of which state to choose next.

Figure 1:
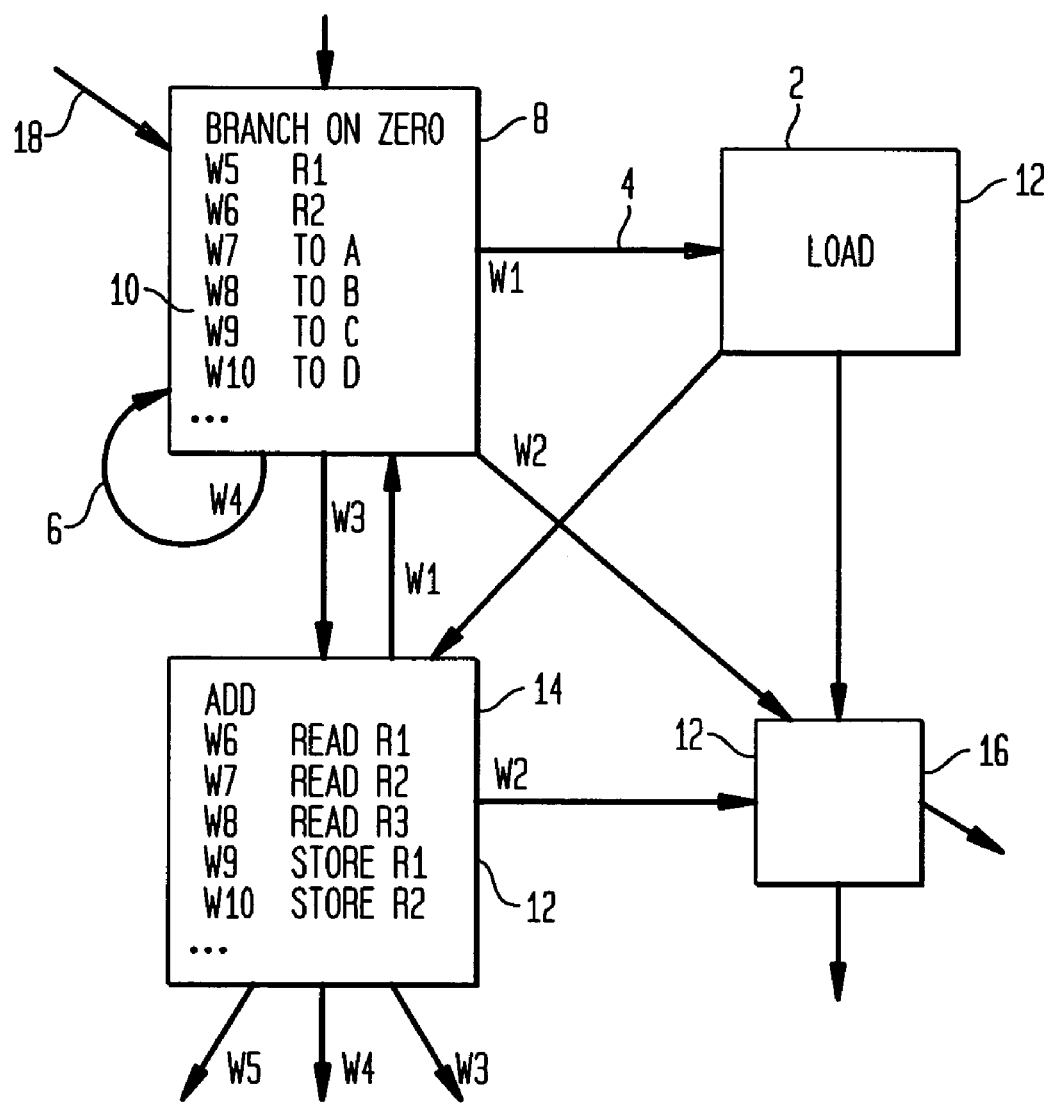
FIG. 1 is a schematic diagram of part of a fuzzy state machine.

FIG. 1 illustrates part of a fuzzy finite state machine for use in an instruction stream generator. In this arrangement, each state corresponds to a single instruction. When generating an instruction, it is in general not sufficient to generate the instruction (also known as the opcode). Other properties associated with the instruction need to be generated, including the operands, for example which addresses the instruction is to access, and which register it is to use. The other random decision associated with each state is the decision as to the next state, which again is selected using weights.

Referring to FIG. 1, an illustrated schematic part of a state machine includes a number of states 2 and transitions between the states 4. It should be noted that some of the transitions between states are self transitions 6 wherein the next state is the same state. This allows the generation of sequences of like instructions. Consider state 8 which relates to a conditional branch instruction. The state 8 includes a first set of weights 10 (W1, W2, . . . W4) relating to the probabilities that the next state is one of a number of subsequent states 12 or a self transition along path 6 back to the original state 8. Other random decisions for the conditional branch instructions represented by the state 8 may include, in this example, the choice of which internal register is to be tested for the conditional branch. In the example register 1 (R1) has a weight (W5) and register 2 (R2) a weight (W6). Further weights W7 to W10 reflect the probabilities of different options as to where the conditional branch jumps to.

It will be appreciated that other states 2 corresponding to different instructions will require different random internal choices and accordingly different sets of weights. For example, state 14 is an add operation. The internal weights for this state include weights representing the probability of which registers are to be added together and the register in which the result is to be stored. Accordingly, there may be weights for each of these registers as part of the internal state 14.

The skilled person will appreciate that different instructions and formats of instructions will in general require different operands and accordingly will require different states, different random decisions and different associated weights.

A possible path 18 through the states of FIG. 1 is illustrated with bold arrows. The path first passes through the conditional branch state 8, onwards through additional state 14 to further state 16. This path generates a corresponding sequence of instructions, with the various opcodes of the instructions determined by the internal weights of the states 8, 14, 16.

Real state diagrams for real processors will be much more complicated than FIG. 1, but the skilled person will readily appreciate how the approach illustrated in FIG. 1 may be implemented for such processors Suitable pseudo code for generating a sequence of 100 instructions from paths through the states is:

```
State *s = choose (0 . . . NUMBER_OF_STATES);
For I = 1 . . . 100 {
    // Generate instruction
    opcode = choose (s->opcode_weights);
    op0 = choose (s->op0_weights);
    op1 = choose (s->op1_weights);
    op2 = choose (s->op2_weights);
    emit (opcode, op0, op1, op2);
    // Choose next state
    s = choose (s->next_weights);
}
```

The code determines the opcodes and three operands for each of the 100 instructions. As will be appreciate, the requirement for three operands is dependent on the specific processor and may be varied as required.

The success of a sequence of instructions may be measured by a number of metrics, in any of a number of ways that will be well known to the person skilled in the art. In particular, metrics may include the number of lines of code that a test exercises, the number of functional conditions that it covers (pipe 4—empty, proximity of resource reuse). Coverage may also be measured in absolute turn or in turns of the coverage that the sequence of instructions achieves that no previous set has achieved. All that is required for the purposes of the present invention is to place a numerical value on the sequence of instructions reflecting its usefulness as a test.

Figure 2:
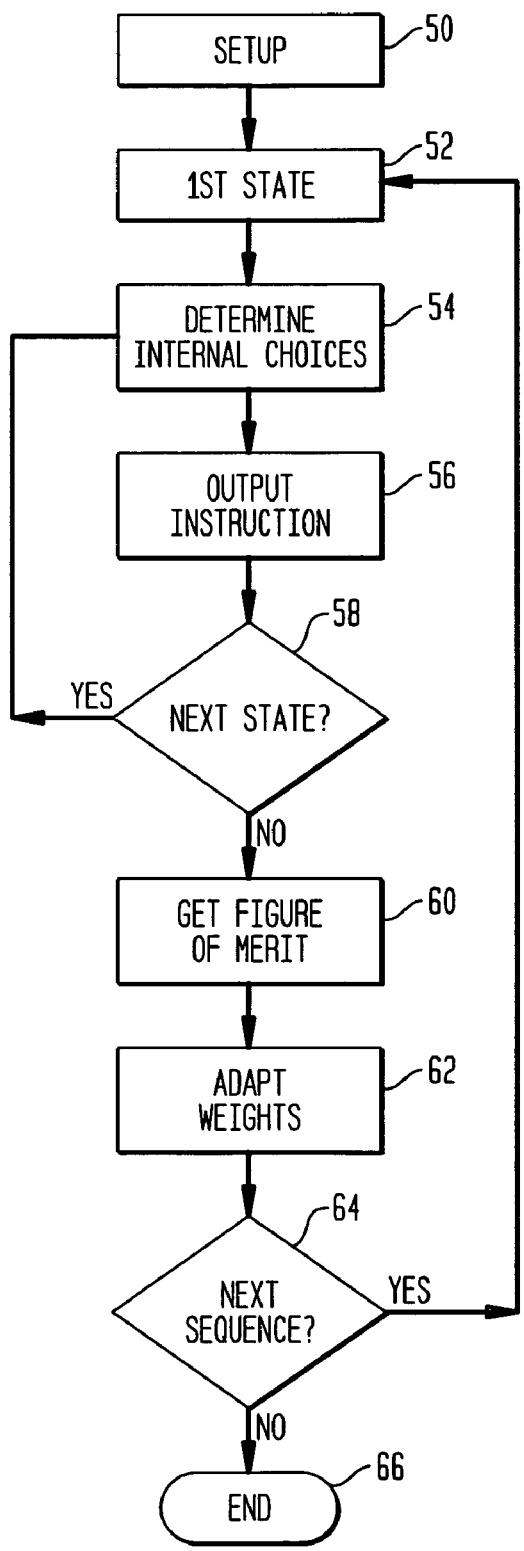
FIG. 2 is a flow diagram of a method according to the invention.
Figure 3:
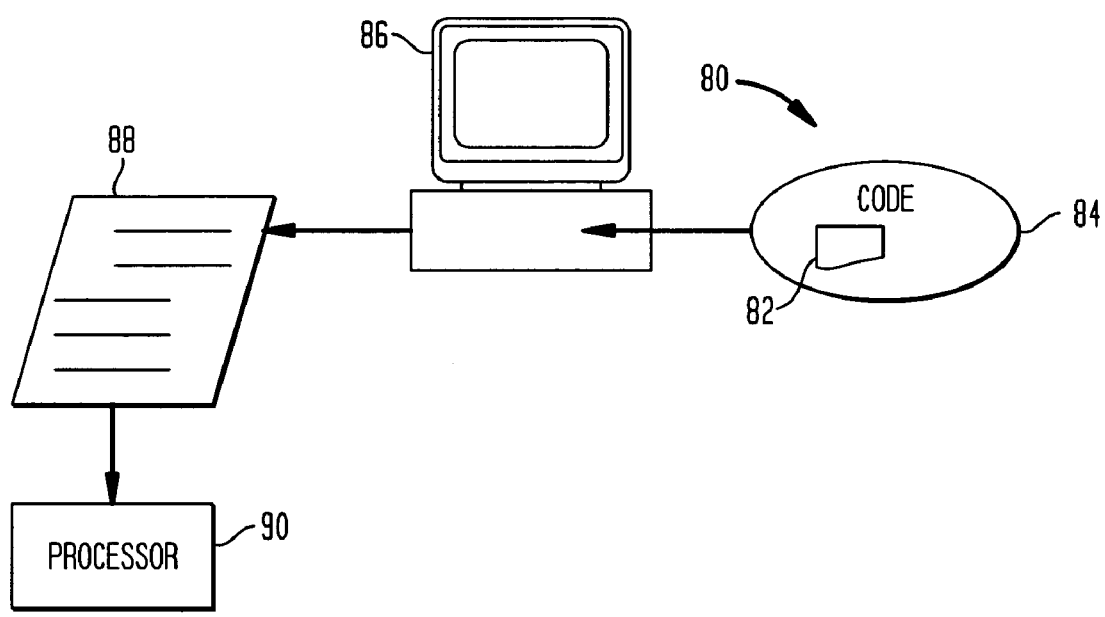
FIG. 3 illustrates an implementation of the invention.

In the described embodiment, a large number of sequences of instructions are generated as illustrated in the flow diagram of FIG. 2. Initially, a fuzzy finite state machine is set up with an initial set of weights in step 50.

The first sequence of instructions is generated starting from a first state selected in step 52.

In step 54, the internal random decisions for the present state are determined, based on the weights associated with those random decisions, and the corresponding instruction and opcodes are output in step 56. In step 58, if the sequence of instructions is not yet complete, the next state and corresponding instruction is selected based on the weights of the present state, and processing continues again from step 54 until a complete sequence of instructions is generated.

After a complete sequence of instructions is generated, a figure of merit is calculated for the sequence of instructions (step 60). Then, in step 62, the weights of the state machine are adjusted based on the figures of merits of preceding sequences of instructions and the weights that were used to generate those sequences. In step 64, it is determined whether sufficient sequences have been regenerated, and if not processing returns to step 52 to generate the first state of the next sequence.

Suitable pseudo code for adapting the weights is:

```
MultiSet<Weights> history;
Forever {
    // Choose a set of weights
    Weights wgt = choose (history);
    // Decay the usefulness of each previous set of weights
    // (10% is chosen arbitrarily as an example)
    history = decay (history, 10%);
    // Generate a set of tests
    TestSet tests = generate (wgt);
    // Determine success
    int fit = usefulness (tests);
    // Add to history
    history += fit * wgt;
}
```

It will be appreciated by the skilled person that different effects can be obtained by altering the way that the next set of weights is calculated from the current history.

The approach used in this embodiment to adapt the weights is similar to that used for the so-called "travelling salesman" problem using a technique that mimics the way in which ants locate sources of food. This approach is described in Bonabeau and Theraulaz, in an article entitled "Swarm Smarts" published in the Scientific American of March 2000 at pages 73 to 79. Ants deposit pheromone trails to forage efficiently as they search for food sources. After initially foraging randomly, the pheromone of ants returning to the nest with food accumulates on well-used trails which means that trails leading to food supplies are marked with more pheromone than trails leading in other directions. Ants leaving the ants nest are more likely to follow trails marked with more pheromone than other trails, and in doing so mark the trail with still more pheromone. In this way, trails leading to food supplies become highly marked.

A like approach has been used to model the travelling salesman problem of determining a short route to travel between various cities. The approach is carried out in a computer in such a way that short paths between cities are marked with lots of "pheromone" and long paths with much less. As will be appreciated, this is indicated in the computer by sizing a high numeric value to such trails. A colony of ants each independently hops from city to city, favouring nearby location but otherwise travelling randomly guided by the pheromone trails. After all the ants have completed their tours of the various cities, the links that belongs to the highest number of short tours will be richest with the "pheromone".

The colony of artificial ants then is released to travel over the cities again, and will be guided by the pheromone trails to favour routes which have previously proved successful over routes that have previously proved unsuccessful. There remains however sufficient randomness to explore other routes as well.

In order to allow routes to be replaced by better routes, the artificial pheromone evaporates, i.e. the values are reduced over several generations. This allows good routes to be replaced by better routes.

The inventors have realised that a significantly modified version of this approach is useful in the very different area of generating test suites. The set of weights that have previously generated good tests are favoured over sets of weights that have previously generated less useful tests.

Each individual weight may be generated pseudo-randomly using the weights described by the history. For example, suppose a particular weight can be in the range 0 to 15 and so far the values 2 and 13 have been chosen with a usefulness 5 and 2. We might generate a number in the range 0 to 15 with the probability 5/7 that it will be in the range 0 to 7 and 2/7 that it will be in the range 8 to 15. Thus, in general the range of possible weights may be partitioned into sub-intervals each of which contain one weight that has previously been generated, and the weight randomly selected with a probability determined by the figures of merit previously obtained with the weight with that partition.

The sub-intervals should be of the form $[a+(b-a).i.2^{-n}, a+(b-a)(i+1).2^{-n}]$, with a, b, i and n integers, and $i=0, \ldots 2^{n-1}$. This divides [a,b) into n sub-intervals.

If more than one previous generation has used the same weight, then the same usefulness numbers may be used.

By decaying the usefulness of each set of weights on each subsequent generation the way that pheromone on each path decays is mimicked. This allows the test generator to redirect itself away from testing features that have been covered in detail, in order to focus on other features that have not yet been fully tested.

In a variation of the above approach it is also possible to record the choices generating each sequence, as well as the weights used to generate a sequence, and feed this information back into the adaptation of the weights for subsequent generations.

The invention may be implemented by a computer program product 80 being code 84 on a data carrier 82. The computer program product contains code 84 for causing a general purpose computer 86 to carry out the method as set out above and output a test data stream 88 of instructions for testing the operation of processor 90. The data carrier 82 may be a hard disc, floppy disc, tape, memory, data transmission cable, or any other data storage means or transmission means. The skilled person will be familiar with many such means.

The processor 90 may be tested by feeding the test data stream 88 to a hardware implementation of the processor 90 and/or by feeding the instructions to a software model of the processor 90.

From the present disclosure, many other modifications and variations will be apparent to persons skilled in the art. Such modifications and variations may involve other features which may be used instead of or in addition to features already disclosed herein. The skilled person will be aware of many such alternative approaches. It should be understood that the scope of the disclosure of the present application includes any and every novel feature or combination of features disclosed herein either explicitly or implicitly and together with all such modifications and variations, whether or not relating to the main inventive concepts disclosed herein and whether or not it mitigates any or all of the same technical problems as the main inventive concepts. The applicants hereby give notice that patent claims may be formulated to such features and/or combinations of such features during prosecution of the present application or of any further application derived or claiming priority therefrom.

The invention claimed is:

1. A method of generating a sequence for testing a processor, comprising:
   providing a finite state machine having a plurality of states corresponding to at least one instruction or argument, wherein each state can be followed by any of a number of the plurality of states, each state having a set of weights defining the probability of at least one random decision, wherein the at least one random decision includes a decision as to a next state to follow;

selecting a current state;

making at least one random decision for the current state in accordance with the weights to generate at least one instruction or argument and to determine a next state to become the current state;

repeating the step of making at least one random decision to generate a sequence of at least one instruction or argument randomly in accordance with the weights;

adapting the weights based on the resulting sequence; and repeating the steps of generating a sequence in order to generate a plurality of sequences covering predetermined test requirements.

2. A method according to claim 1 wherein the step of adapting the weights includes determining a figure of merit for the sequence; and adjusting the weights as a function of the figure of merit of at least one of the sequence or of the preceding sequences.

3. A method according to claim 2 wherein the step of adjusting the weights includes generating the weights for each generation pseudo-randomly ascribing a higher probability to weights in ranges that gave high figures of merit in previous generations and low probabilities to weights in ranges that gave low figures of merit in previous generations.

4. A method according to claim 3 wherein the relevance of figures of merit of earlier sets of weights are decayed with each succeeding generation so the figures of relevance of recent generations have more effect than those of earlier generations.

5. A method according to claim 2 wherein the figure of merit of a sequence reflects the coverage that sequence provides of required tests that previous sequences have not exercised.

6. A method of testing a processor, comprising:

providing a finite state machine having a plurality of states corresponding to at least one instruction or argument, wherein each state can be followed by any of a number of the plurality of states, each state having a set of weights defining the probability of at least one random decision, wherein the at least one random decision includes a decision as to a next state to follow;

selecting a current state;

making at least one random decision for the current state in accordance with the weights to generate at least one instruction or argument and to determine a next state to become the current state;

repeating the step of making at least one random decision to generate a sequence of at least one instruction or argument randomly in accordance with the weights;

repeating the steps of generating a sequence in order to generate a plurality of sequences covering predetermined test requirements; and feeding the generated sequence to at least one of a processor or representation of a processor to test the processor.

7. A method according to claim 6 further including the step of adapting the weights based on at least one of the generated sequence or sequences.

8. A computer program product recorded on a data carrier for generating a sequence for testing a processor, the computer program product including code for causing a computer to carry out the steps of:

setting up a finite state machine having a plurality of states corresponding to at least one instruction or argument, wherein each state can be followed by any of a number of the plurality of states, each state having a set of weights defining the probability of at least one random decision, wherein the at least one random decision includes a decision as to a next state to follow;

selecting a first current state;

making at least one random decision for the current state in accordance with the weights to generate at least one instruction or argument and to determine a next state to become the current state;

repeating the step of making at least one random decision to generate a sequence of at least one instruction or argument randomly in accordance with the weights;

adapting the weights based on the sequence; and repeating the steps of generating a sequence and adapting the weights, in order to generate a plurality of sequences covering predetermined test requirements.

9. A computer program product according to claim 8 including code for adapting the weights by determining a figure of merit for the sequence; and adjusting the weights as a function of the figure of merit of at least one of the sequence or of the preceding sequences.

10. A computer program product according to claim 9 wherein the code for adapting the weights includes code for generating the weights for each generation pseudo-randomly ascribing a higher probability to weights in ranges that gave high figures to merit in previous generations and low probabilities to weights in ranges that gave low figures of merit in previous generations.

11. A computer program product according to claim 10 wherein the relevance of figures of merit of earlier sets of weights are decayed with each succeeding generation so that the figures of relevance of recent generations have more effect than those of earlier generations.

12. A computer program product according to claim 11 wherein the figure of merit of a sequence reflects the coverage that sequence provides of required tests that previous sequences have not exercised.

* * * * *